(12) United States Patent
Imai

(10) Patent No.: US 7,225,719 B2
(45) Date of Patent: Jun. 5, 2007

(54) SPEED GOVERNOR AND DISTRIBUTING VALVE FOR HYDRAULIC TURBINES

(75) Inventor: Hideaki Imai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/134,295

(22) Filed: May 23, 2005

(65) Prior Publication Data

US 2005/0260064 A1    Nov. 24, 2005

(30) Foreign Application Priority Data

May 24, 2004    (JP)    ............................. 2004-152694

(51) Int. Cl.
*F15B 13/04*    (2006.01)
*F16K 11/07*    (2006.01)

(52) U.S. Cl. ............................. 91/366; 91/466; 60/453; 137/625.66

(58) Field of Classification Search .................. 60/453, 60/584; 91/358 R, 366, 466; 92/79; 137/556, 137/625.25, 625.66; 251/285

See application file for complete search history.

(56) References Cited

U.S. PATENT DOCUMENTS 4,515,184 A * 5/1985 Bownass et al. ............. 137/556
5,853,071 A * 12/1998 Robinson ..................... 60/584

FOREIGN PATENT DOCUMENTS

JP    2000-018145    1/2000

* cited by examiner

*Primary Examiner*—Michael Leslie
(74) *Attorney, Agent, or Firm*—Dickstein Shapiro LLP

(57) ABSTRACT

A distributing valve for a speed governor of a turbine is provided, the distributing valve having a structure to reliably vent air therefrom. The distributing valve is disposed such that the direction of movement of a plunger is horizontal, with air vent valves being provided at the highest portion of each of ports of the distributing valve, to facilitate reliable venting of air out of a pressure oil system. Also provided is a structure of the distributing valve to facilitate machining or assembly of the distributing valve.

10 Claims, 2 Drawing Sheets

SPEED GOVERNOR AND DISTRIBUTING VALVE FOR HYDRAULIC TURBINES

BACKGROUND OF THE INVENTION

1. Field of Invention

The present invention relates to the speed governors and distributing valves for hydraulic turbines and pump turbines, and particularly to three-way distributing valves for the speed governor of hydraulic turbines or the like.

2. Related Art

Three-way distributing valves are used in a speed governor for controlling a hydraulic servomotor driving the guide vanes for adjusting the volume of water that enters a hydraulic turbine or a pump turbine. An example of the three-way distributing valve for the speed governor of hydraulic turbines or pump turbines is disclosed in Patent Document 1, in which a hydraulic amplifier (three-way distributing valve) is disposed such that the plunger (main valve) can be moved vertically. The plunger is driven by a control piston that is vertically moved by pressure oil supplied via a pilot valve. Because the plunger is adapted to be moved up and down by the control piston, the control piston is directly connected to the main valve in an integral structure.

Patent Document 1: JP Patent Publication (Kokai) No. 2000-18145 A

SUMMARY OF THE INVENTION

In the pressure oil system of a speed governor, air that enters the system must be removed because such air can cause instability phenomenon, such as hunting in the control system. Normally, the three-way distributing valve for the speed governor is installed at the highest position in the pressure oil system involved with the control of the hydraulic servomotor for guide vanes. Although not explicitly described in Patent Document 1, the body of the hydraulic amplifier (three-way distributing valve for the speed governor) is generally fitted with an air vent valve so that the air that enters the control pressure oil can be vented out. However, the air vent valve cannot be installed at the highest position of each of the pressure oil port, open-side port, and closed-side port, for reasons of structure of the conventional three-way distributing valves for speed governors. In particular, the air that builds up at a position higher than the air vent valve (such as in the upper chamber above the guide of the plunger (main valve), although not explicitly described in Patent Document 1) cannot be let out.

If the hydraulic servomotor were to be controlled with the air remaining in the pressure oil system, chattering would be caused by the difference in the compression ratios of oil and air, resulting in an uneven transmission of power. As a result, the hydraulic servomotor would not be able to be appropriately controlled with respect to the target opening angle instructed from the a higher-level control unit. It could also produce an inherent factor for causing an oil hammer phenomenon in the pressure oil system. Further, a sliding movement could be produced by the hunting phenomenon, which could possibly damage equipment.

The plunger (main valve) experiences a sliding movement against its valve seat, and the control piston experiences a sliding movement against its body. Because the plunger and the control piston are directly connected (integral structure), they must be manufactured and assembled such that the high levels of precision in terms of perpendicularity and eccentricity required for the integral structure can be met, resulting in longer production time or increased cost.

It is therefore an object of the invention to provide a distributing valve structure which allows air to be vented out of the distributing valve used in a speed governor for hydraulic turbines or the like in a reliable manner.

It is another object of the invention to provide a distributing valve structure which allows a distributing valve used in a speed governor for hydraulic turbines or the like to be manufactured and assembled in a simplified manner.

In order to achieve the first object of the invention, a distributing valve is structured such that the direction of movement of the plunger (main valve) of the distributing valve is horizontal, with an air vent valve provided at the highest portion of each of the ports of the distributing valve.

In order to achieve the second object of the invention, a distributing valve is structured such that, in addition to the direction of movement of the plunger (main valve) of the distributing valve being horizontal, the plunger and the control piston are structured separately, with the control piston disposed at either end of the plunger.

In accordance with the present invention, the air vent valve can be mounted at the highest portion of the distributing valve, so that air can be vented out of the pressure oil system reliably.

Furthermore, because the structure of the invention does not require the high levels of precision in terms of perpendicularity and eccentricity that are required in an integral structure of the plunger and the control pistons, manufacturing and assembly of the structure is facilitated. The horizontal direction of movement of the plunger of the distributing valve requires that the disassembly and assembly of the distributing valve be performed from the horizontal direction. However, because the plunger and the control piston are separately structured, the structure of the invention suffers from less restrictions in terms of installment space as compared with an integral structure.

DESCRIPTION OF THE PREFERRED EMBODIMENTS

The invention will be described hereunder by way of embodiments thereof, with reference made to the drawings.

Figure 1:
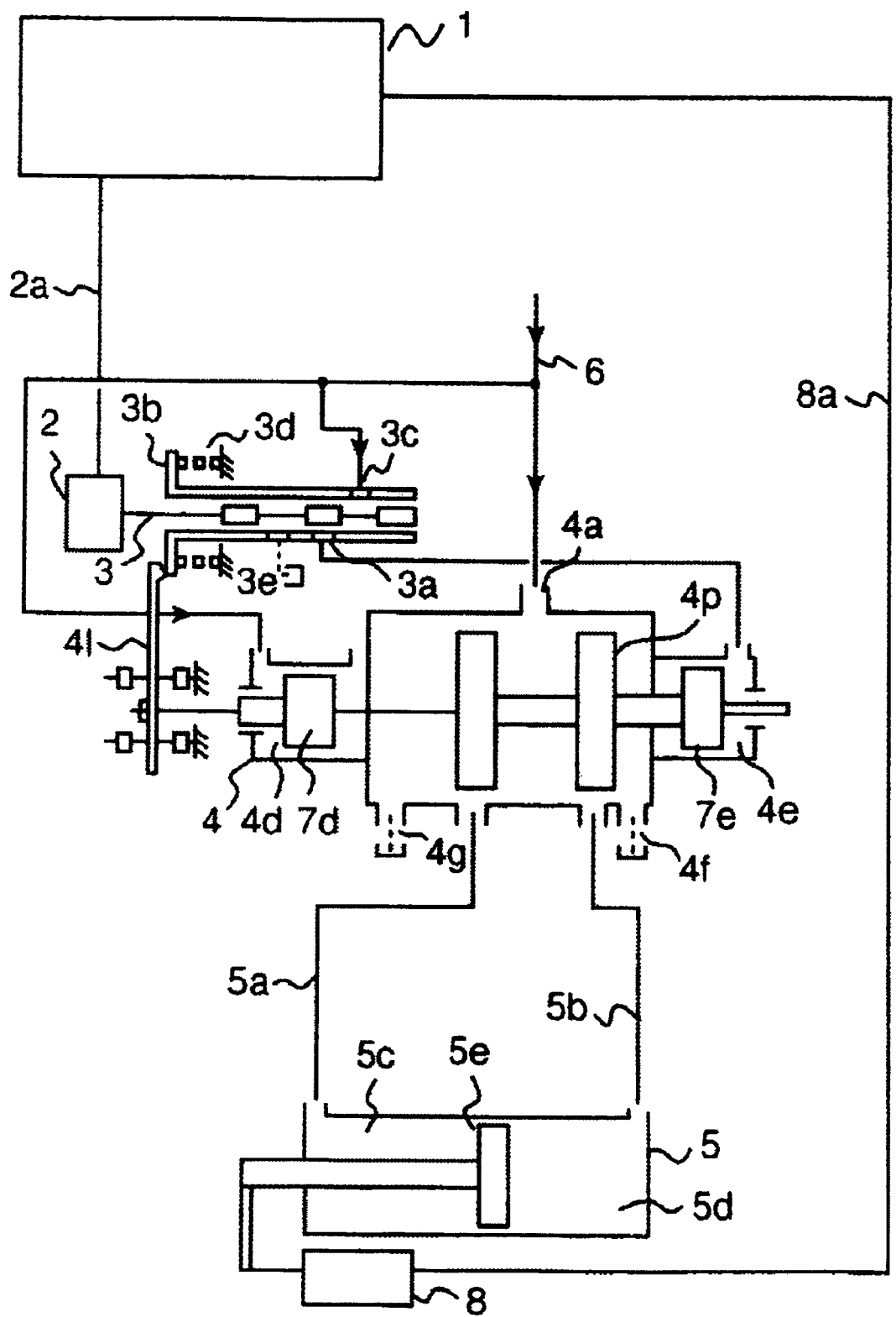
FIG. 1 shows a schematic diagram of a speed governor in an embodiment of the present invention.

FIG. 1 shows a schematic diagram of a speed governor for controlling the guide vanes of a hydraulic turbine or a pump turbine installed at a hydraulic power plant.

A control unit 1 outputs a control signal (control target electric signal) for controlling the guide vanes to an electromechanical transducer 2. The electromechanical transducer 2, which is a converter for turning the electric signal into a mechanical movement, causes a pilot valve 3 directly connected to the electromechanical transducer 2 to move so as to feed the control pressure oil for driving a control piston 7d or 7e to a portion 4d or 4e of a distributing valve 4. For example, when an open-side signal for opening the guide vanes is outputted from the control unit 1, the pilot valve 3 is shifted to the left in the figure by the electromechanical transducer 2. As the pilot valve 3 is shifted to the left, because the pressure oil 6 is fed from a pressure oil tank (not shown) to the portion 3c of a pilot valve sleeve 3b and to portions 4d and 4a of the distributing valve 4 at all times, the pressure oil at portion 3c passes through the portion 3a and is supplied to a portion 4e of the distributing valve 4.

When the pressure oil reaches the portion 4e of the distributing valve 4, because an areal difference is provided between the portions 4e and 4d of the distributing valve 4 and the area of the portion 4e is greater, a plunger (main valve) 4p is shifted to the left. As the plunger is shifted to the left, the pressure oil at the portion 4a of the distributing valve 4 passes through a portion 5a and reaches a portion 5c of a guide vane servomotor 5, where it causes a piston 5e of the guide vane servomotor to move to the right (the open side). Meanwhile, the pressure oil in a portion 5d of the guide vane servomotor 5 is passed through the portion 5b and discharged via a portion 4f of the distributing valve 4, thereby allowing the guide vane servomotor 5 to perform an opening operation.

Also, as the plunger 4p is shifted to the left, a lever 41 attached to the plunger 4p is simultaneously shifted to the left. This causes the pilot valve sleeve 3b to be also moved to the left by the force provided by a compression spring 3d in such a manner as to follow the lever 41. When an opening in the pilot valve sleeve 3b for the passage of the pressure oil to the portion 3a overlaps the pilot valve 3, the pressure oil at the portion 3a is not allowed to be delivered, so that the position of the plunger 4p is maintained while the guide vane servomotor 5 continues the open-side operation.

The position of the guide vane servomotor is detected by a position detector 8 and fed back to the control unit 1 in the form of an electric signal 8a. When the target position is reached, the control unit 1 outputs an electric signal for causing the pilot valve 3 to be shifted (to the right) by the plunger 4p to a position where the pressure oil is not allowed to reach the portions 5a and 5b, and then the operation of the guide vane servomotor 5 is terminated.

On the other hand, when a close signal is outputted from the control unit 1, the pressure oil in the portion 4e of the distributing valve 4 is discharged via the portions 3a and 3e of the pilot valve sleeve 3b, such that the plunger 4p is shifted to the right and the pressure oil at the portion 4a of the distributing valve 4 passes through the portion 5b and causes the guide vane servomotor 5 to be moved to the left (the closed side). The pressure oil in the portion 5c of the guide vane servomotor 5 is discharged from a portion 4g of the distributing valve via the portion 5a.

Figure 2:
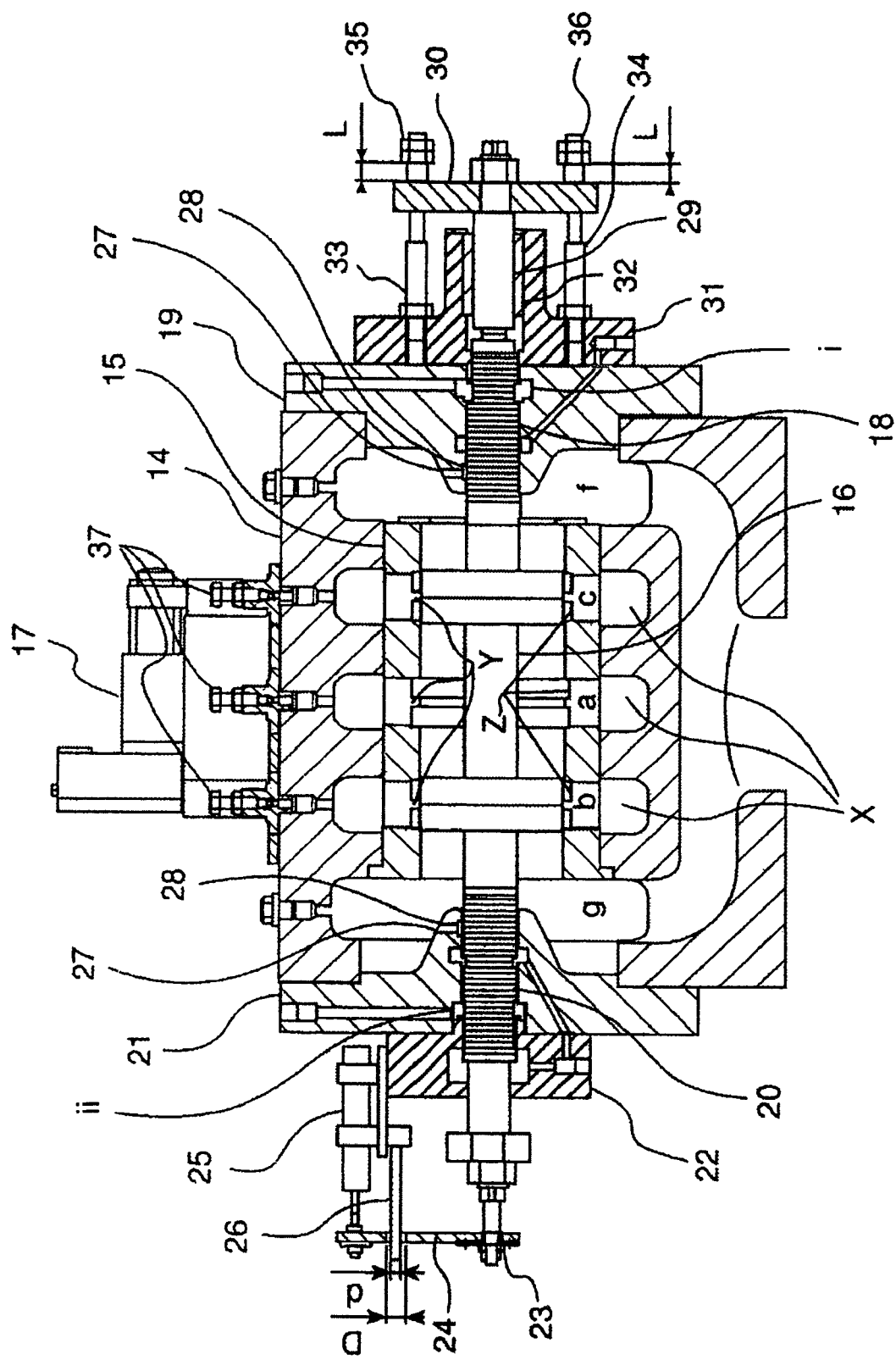
FIG. 2 shows the structure of a three-way distributing valve in an embodiment of the present invention.

FIG. 2 shows the structure of a distributing valve (a three-way distributing valve for the speed governor of a hydraulic turbine or pump turbine) in accordance with an embodiment of the invention.

In the distributing valve shown in FIG. 2, a plunger 16 for switching the direction of feeding of the pressure oil is controlled to be shifted horizontally. The plunger 16 is constructed separately from control pistons 18 and 20 for moving the plunger 16 to the left or right. Specifically, the control pistons 18 and 20 are disposed at either end of the plunger 16. The plunger 16 is disposed within a valve seat 15, which acts as the sliding guide for the plunger 16. The valve seat 15 includes an operating pressure oil port a to which the pressure oil is fed constantly from a pressure oil tank (not shown; the same applies below), an open-side port b for feeding the pressure oil to the open side of the servomotor, and a closed-side port c for feeding the pressure oil to the closed side of the servomotor. These ports are provided at 4 or 8 locations on the periphery of the valve seat for ensuring a sufficient flow volume. On the exterior of the valve seat 15, a body 14 is disposed. At either end of the body 14, covers 19 and 21, each with the control piston 18 or 20 disposed therein, are attached. The control pistons 18 and 20 and the covers 19 and 21 together comprise a plunger movement control unit for controlling the horizontal movement of the plunger 16. The control pressure oil is fed from the electromechanical transducer 17 to a pressure-receiving chamber (i) provided in the cover 19, while to a pressure-receiving chamber (ii) provided in the cover 21, the pressure oil is constantly fed from the pressure oil tank. The electromechanical transducer 17 carries out an oil pressure control by shifting the pilot valve as shown in FIG. 1 in response to a control target electric signal from the higher-level control unit. As shown in FIG. 2, the control pistons 18 and 20 in the pressure-receiving chambers (i) and (ii) have different pressure-receiving areas. Specifically, the pressure-receiving chambers (i) and (ii) have the pressure-receiving area ratio of generally 2 to 1, and the horizontal movement of the control pistons 18 and 20 are controlled by the balance of operating force determined by the areal difference. The movement of the plunger 16 is thus controlled, whereby the direction of the pressure oil is switched in three ways.

Assuming that the plunger 16 has been moved to the left, the pressure oil fed from the pressure oil tank is fed to the open side of the servomotor as a control pressure oil, via the operating pressure oil port a and the open-side port b. As a result, the servomotor of the guide vanes for adjusting the volume of water that flows into the hydraulic turbine or pump turbine operates in the open direction, namely, in the direction such that the volume of water into the hydraulic turbine or pump turbine increases. On the other hand, the oil on the close side of the servomotor is discharged to an oil discharge port f via the closed-side port c. Similarly, when the plunger 16 has been moved to the right, the pressure oil fed from the pressure oil tank is fed, as the control pressure oil, to the closed side of the servomotor via the operating pressure oil port a and the closed-side port c. As a result, the servomotor for the guide vanes for adjusting the volume of water that flows into the hydraulic turbine or pump turbine is operated in the closing direction, while the oil at the open side of the servomotor is discharged to another oil discharge port g via the open-side port b.

In the inner circumference of the body 14, a cylindrical space X is formed that is compartmentalized for the operating pressure oil port a, the open-side port b, and the closed-side port c individually. An air vent valve 37 is installed at the highest position of each space. Thus, the plunger 16 is disposed horizontally and a cylindrical space compartmentalized for the individual switching ports of the plunger 16 is provided in the inner circumference of the body 14. In this way, the air that has entered into the pressure oil system can be collected at the highest position of the body 14, namely, the highest position of the pressure oil system (where the air can be vented). By thus disposing the air vent valve s 37 at the highest position of the body 14, the air that gathers in the pressure oil system, including the servomotors, can be completely vented.

Because the air that enters into the pressure oil system can be completely removed by structural means, the servomotors can be reliably and correctly controlled with respect to the control target opening angle without bringing about the chattering or oil hammer phenomenon.

In the embodiment of FIG. 2, the plunger movement control units (control pistons 18 and 20) are separated from the plunger 16 and disposed at left and right ends of the plunger 16, so that the control pressure oil from the electromechanical transducer 17 can be fed to the pressure-receiving chamber (i) and the pressure oil from the pressure oil tank is fed to the pressure-receiving chamber (ii). This structure allows the operating force of each of the plunger movement control units to act in a direction in which the plunger 16 is pushed, thereby enabling the plunger 16 to be controlled in an equivalent manner to when the plunger 16 and the plunger movement control units are integrally formed. Further, by controlling the pressure oil fed to the pressure-receiving chamber (i), the operating force generated in the pressure-receiving chambers (i) and (ii) can be adjusted. Thus, the movement of the plunger 16 can be controlled by the balance between the operating forces provided by the pressure-receiving chambers (i) and (ii). In this embodiment, because the plunger 16 and the plunger movement control units are separated and the control units are disposed at either end of the plunger 16, the operating space can be reduced even when the plunger 16 is disposed horizontally, as compared with the examples where the plunger 16 and the plunger movement control units are integrally formed. This significantly reduces the installing space restrictions on the three-way distributing valve for a speed governor. Further, the high precision that is required when the plunger and the control pistons are integrally formed in terms of perpendicularity and eccentricity during manufacture or assembly is not required, so that the production time and cost can be reduced.

Furthermore, in the embodiment shown in FIG. 2, when the plunger 16 of the three-way distributing valve for a speed governor is assembled, particularly when the body 14 and the valve seat 15 are assembled as installed, guides Y are provided in the valve seat 15 in advance for guiding the assembly of the plunger 16. Specifically, the inside of the valve seat 15 is machined to provide the entire inner circumference thereof with grooves Z. The grooves Z are provided so as to ensure a predetermined flow volume, including the flow of the pressure oil from parts other than the ports. The guides Y are formed in a convex shape throughout the circumference where the ports are not formed. In a case where the plunger 16 is disposed horizontally, when assembling the plunger 16 within the valve seat 15, the width of a switching valve of the plunger 16 is nearly equal to the grooved portion of the valve seat 15 where a lap is formed by the switching valve of the plunger 16 and the valve seat 15. By thus providing the guide Y, the problem of the weight of the plunger or the lack of skill of the assembly worker producing a tilt due to gaps caused by the difference in diameter of the plunger 16 and the valve seat 15, which would prevent a smooth assembly operation or potentially damage the important portions of the plunger 16 and valve seat 15, can be eliminated. In other words, by providing the guide Y for guiding the outer circumference of the switching valve of the plunger 16 at the grooved portion of the pressure oil port when the switching valve is located at a neutral position relative to the valve seat 15, where the control pressure oil is blocked, the assembly of the plunger 16 can be facilitated. Preferably, when the plunger 16 is located at the neutral position blocking the control pressure oil, the guide Y is also provided at the grooved portion of the pressure oil port of the valve seat where the switching valve of the plunger 16 is not located. The guide Y provided in the valve seat 15 is dimensioned to match the inner diameter of the valve seat 15. The width of the guide Y is determined such that the amount of movement of the switching valve in the radial direction due to the tilting of the plunger, which is produced by the radial gap between the plunger 16 and the valve seat 15 when one of the switching valves of the plunger 16 passes through the grooved portion of the valve seat 15, is not more than the radial gap at either end of the grooved portion of the valve seat 15. This feature allows the switching valves of the plunger 16 to be supported at at least two points at all times, thereby preventing the detaching of the plunger 16 when assembling it within the valve seat 15.

Further, in the embodiment of FIG. 2, the covers 19 and 21 in the plunger movement control units include vertical openings 27 connecting the oil discharge ports g and f with the sliding portions of the control pistons 18 and 20, respectively. Lower ends 28 of the vertical openings 27 are positioned at the top of the sliding portion of the control pistons 18 and 20. Thus, the oil discharged from the open-side port b or the closed-side port c is collected in the vertical openings 27 when passing through the oil discharge ports g or f. The thus collected oil gradually flows into the gap between the piston 18 and the cover 19 and the gap between the piston 20 and the cover 21 in a free-fall manner. The oil thus flowing into the gaps functions as a lubricant for those sliding portions, thereby providing a smooth sliding property.

The amount of oil that flows into the radial gap between piston 18 and cover 19 or the radial gap between piston 20 and cover 21 can be increased by providing an elliptical or rectangular groove in lower end portions 28 of the vertical openings 27 of the covers 19 and 21. In this example, jamming or scuffing due to lack of lubrication can be prevented and so a smooth sliding property can be obtained between the covers and pistons.

More specifically, the vertical openings 27, for example, are provided for the following reasons. When the plunger movement control units are disposed at either end of the plunger 16, the sliding portions of the control pistons 18 and 20, which control the movement of the plunger 16, and those of the covers 19 and 21, which guide the control pistons 18 and 20, are located in the oil discharge ports f and g, via which the control pressure oil is discharged from the servomotor in response to the opening and closing control of the three-way distributing valve for the speed governor. For this reason, the pressure of the oil that passes through these portions decreases to substantially the atmospheric pressure. Meanwhile, because the radial gap between the control pistons 18 and 20 and the covers 19 and 21 is very small, the oil under the atmospheric pressure does not easily reach the sliding portions, thereby resulting in a poor lubricating performance at the sling portions. As a result, the chances of the control pistons coming into a direct mechanical contact with the covers increases, leading to the problem of jamming due to lack of lubrication. In the above-described embodiment, therefore, the vertical openings 27 are provided in the covers 19 and 21, which guide the control pistons 18 and 20, such that they are in fluid communication with the sliding portions of the control pistons 18 and 20 and those of the covers 19 and 21. In this way, the oil that is discharged from the switching ports of the plunger can be guided to the sliding portions so as to supply the oil there in a free-fall fashion, thereby ensuring proper lubrication and preventing the jamming between the control pistons and the covers.

Furthermore, the embodiment shown in FIG. 2 is provided with a mechanism for limiting the operating speed of the servomotor. Specifically, since the increase in water pressure upon blocking the volume of water that enters the hydraulic turbine must be controlled within a certain range, the maximum operating speed of the servomotor for the guide vanes for adjusting the volume of water entering the hydraulic turbine at a hydraulic power plant is determined such that the increase in water pressure can be controlled within a certain range. Such a maximum operating speed of the servomotor must be observed also from the viewpoint of protecting the speed governor in case it fails. Because the operating speed of the servomotor is proportional to the amount of oil fed per unit time, it is necessary to limit the amount of oil that flows out of the three-way distributing valve for the speed governor. The amount of oil that flows out of the three-way distributing valve for the speed governor shown in FIG. 2 is determined by the amount of movement of the plunger 16, namely, the area of opening produced by the switching valves of the plunger 16 and the valve seat 15. The present embodiment includes a mechanism for mechanically limiting the amount of movement of the plunger 16 in order to limit the maximum amount of oil that flows out of the three-way distributing valve for the speed governor.

This movement limiting mechanism is made up of a rod 29, a bush 32, a plate 30 (either rectangular or circular in shape), stoppers 33 and 34, and adjusting screws 35 and 36. It functions to mechanically limit the amount of movement of the control piston 18 of the plunger movement control units. The movement limiting mechanism is attached to a cover 31 attached to the cover 19. The rod 29 is disposed coaxially with the control piston 18 and can be moved to the left and right freely. The plate 30 is attached to the rod 29 in an integral manner. The stoppers 33 and 34 are mounted on the plate 30 symmetrically with respect to the axis of the rod 29, namely, with respect to the axis of the control piston 18. The adjusting screws 35 and 36 are attached to the stoppers 33 and 34, with the gap L between the plate 30 and each of the adjusting screws 35 and 36 being adjusted to be identical. In this manner, the amount of movement of the rod 29 and control piston 18 is limited. Thus, in accordance with the present embodiment, the movement of the control piston is limited by providing the two stoppers 33 and 34, which are operated simultaneously, symmetrically with respect to the center of the control piston and causing them to act on the plate 30. Accordingly, the maximum amount of oil that flows out of the three-way distributing valve for the speed governor can be limited without subjecting the rod 29 and control piston 18 (plunger movement limiting unit) to a biased load. And because the movement limiting mechanism does not subject the plunger movement control unit to a biased load, the normal control state of the plunger movement control units is not impeded. The movement limiting mechanism of the present embodiment may be modified to be movable by providing the stoppers 33 and 34 with a piston mechanism.

The embodiment of FIG. 2 is also provided with a unit for detecting the amount of movement of the plunger, which detects the amount of movement of the plunger by detecting the amount of movement of the control pistons. The plunger movement amount detecting unit is made up of a bearing 23 mounted at the tip of the control piston 20, a position-detecting lever 24 attached to the bearing 23, a sensor 25 attached to the lever 24, and a guide pin 26. The bearing 23 holds the control pistons 20 in its inner ring and bears the lever 24 on its outer ring. The sensor 25, which is mounted on a cover 22 attached to the cover 21, is connected to the lever 24 on the opposite side to where the lever 24 is connected to the bearing 23. The lever 24 has an opening in which the guide pin 26 is inserted. The gap (D-d) between the opening in the lever 24 and the guide pin 26 is dimensioned such that no load would be placed on the sensor 25 even if the lever 24 is rotated about the point of connection with the control piston 20 (bearing 23). In other words, it is dimensioned such that the opening in the lever 24 would not come into contact with the guide pin 26.

There is no restrictions to the movement of the control piston 20 as far as its circumferential direction is concerned and so it can rotate freely. Therefore, when the lever 24, which is a position-detecting support, is mounted on the control piston 20 and the sensor 25 is separately installed on the fixed side (cover 22), the rotational movement of the control piston 20 is transmitted to the support and the sensor 25 mounted on the fixed side could possibly be damaged by the rotational movement of the control piston 20. In the present embodiment, however, the bearing 23 is provided where the position-detecting lever 24, which transmits the amount of movement of the control piston 20 to the sensor 25, is connected to the control piston 20. Thus, the rotational movement of the control piston 20 can be absorbed by the bearing 23, thereby allowing the sensor-side of the lever 24 to be maintained at a constant position. As a result, the putting of load to the sensor 25 due to the rotational movement of the control piston 20 can be prevented.

What is claimed is:

1. A speed governor for controlling a hydraulic servomotor that drives guide vanes of a turbine, comprising:
    a distributing valve for feeding a control pressure oil to said hydraulic servomotor;
    a pilot valve for feeding the control pressure oil to said distributing valve; and
    an electromechanical transducer for driving said pilot valve in accordance with an electric signal sent from a control unit, wherein
    said distributing valve comprises:
        a plunger including a pressure oil switching valve;
        a valve seat disposed on an outer circumference of said plunger and including a pressure oil switching port;
        a body disposed on the outer circumference of said valve seat; and
        a plunger movement control unit for moving said plunger responsive to feeding of the control pressure oil from said pilot valve, wherein
    said distributing valve is disposed such that direction of movement of said plunger is horizontal, said distributing valve further comprising an air vent valve disposed at the highest position in a space formed in said body in which the pressure oil is contained.

2. The speed governor according to claim 1, wherein said distributing valve is disposed at the highest position in a pressure oil system of said speed governor.

3. A speed governor for controlling a hydraulic servomotor that controls guide vanes of a turbine comprising:
    a distributing valve for feeding a control pressure oil to said hydraulic servomotor;
    a pilot valve for feeding the control pressure oil to said distributing valve; and
    an electromechanical transducer for driving said pilot valve in accordance with an electric signal sent from a control unit, wherein
    said distributing valve comprises:
        a plunger including a pressure oil switching valve;
        a valve seat disposed on an outer circumference of said plunger and including a pressure oil switching port;
        a body disposed on the outer circumference of said valve seat; and
        a plunger movement control unit for moving said plunger in response to feeding of the control pressure oil from said pilot valve, wherein
    said distributing valve is disposed such that direction of movement of said plunger is horizontal, and said body includes a cylindrical space on an inner circumferential side thereof, said space being compartmentalized for each pressure oil switching port, said distributing valve further comprising an air vent valve that is in fluid communication with said cylindrical space.

4. A distributing valve for performing an oil pressure amplification based on a control pressure oil fed from a pilot valve, comprising:
- a plunger including a pressure oil switching valve;
- a valve seat disposed on an outer circumference of said plunger and including a pressure oil switching port;
- a body disposed on the outer circumference of said valve seat; and
- a plunger movement control unit for moving said plunger in response to feeding of control pressure oil from said pilot valve, wherein said distributing valve is disposed such that direction of movement of said plunger is horizontal, said distributing valve further comprising an air vent valve disposed at the highest position of a space formed in said body in which the pressure oil is contained.

5. The distributing valve according to claim 4, wherein said plunger movement control unit is disposed at either end of said plunger, each plunger movement control unit being formed separately from said plunger and comprising:
- a control piston disposed such that it can move in a horizontal direction;
- a cover with said control piston disposed on an inner circumference thereof, said cover being attached to said body; and
- a pair of pressure-receiving chambers that produce a force for moving said control piston in response to feeding of pressure oil, wherein
- the pressure oil is fed to said pressure-receiving chamber of one of said plunger movement control units from said pilot valve, while the pressure oil is constantly fed to said pressure-receiving chamber of an other of said plunger movement control units from a pressure oil tank.

6. The distributing valve according to claim 5, wherein said cover includes a communicating opening formed towards said body, said communicating opening being in fluid communication with a sliding portion between said control piston and said cover such that the pressure oil can be fed to the sliding portion by force of gravity.

7. The distributing valve according to claim 6, wherein at least a portion of said communicating opening towards the sliding portion is one of elliptical and rectangular in shape.

8. The distributing valve according to claim 4, wherein said valve seat includes a guide for guiding the outer circumference of said switching valve in a neutral position in which said pressure oil switching valve blocks the control pressure oil within said distributing valve.

9. The distributing valve according to claim 4, further comprising a movement amount limiting mechanism for mechanically limiting the amount of movement of said control pistons, said movement amount limiting mechanism comprising a plate that is fixed to said control piston, and a stopper for limiting a horizontal movement of said plate at two point thereof that are symmetric with respect to an axial center of said control pistons.

10. The distributing valve according to claim 4, further comprising a detecting unit for detecting an amount of movement of said plunger, said detecting unit comprising a bearing fixed to said control piston, a lever fixed to an outer ring of said bearing, a sensor for detecting the amount of movement of said lever in the horizontal direction, and a guide for limiting rotation of said lever about an axis of said control piston.

* * * * *